United States Patent Office 3,158,639
Patented Nov. 24, 1964

3,158,639
REACTION PRODUCTS OF ALCOHOLS WITH
CARBYL SULFATES
Donald L. Klass, Barrington, and Thomas W. Martinek,
Crystal Lake, Ill., assignors to The Pure Oil Company,
Chicago, Ill., a corporation of Ohio
No Drawing. Filed July 22, 1960, Ser. No. 44,529
6 Claims. (Cl. 260—456)

This invention relates to certain novel sulfur-containing organic compounds and to a method of preparing said compounds. In particular, this invention is concerned with the reaction of carbyl sulfate, or derivatives thereof, with alcohols, phenols, glycols, or other organic compounds containing one or more reactive OH groups as the only reactive substituents, to produce mixed acid esters of sulfuric and sulfonic acids which are useful as intermediates in the preparation of detergents and other useful compounds.

Carbyl sulfate, also known as ethionic anhydride, has been known in the chemical literature since 1838. See Ann. Phrm., 25, 32–47 (1838). Carbyl sulfate has been reported to react with amines to form novel thiamides, (Ebel, U.S. Patent 2,666,788, or British Patent 686,061), but has not been reported to undergo the reaction or produce the novel products of our invention.

It is one object of this invention to provide a new class of compounds derived from carbyl sulfate and its derivatives.

Another object of this invention is to provide an improved class of detergents which are derived from carbyl sulfate or carbyl sulfate derivatives.

Another object of this invention is to provide an improved process for the preparation of novel sulfur-containing organic compounds from carbyl sulfate.

A feature of this invention is the provision of a novel class of compounds consisting of the mixed sulfate-sulfonate esters derived from carbyl sulfate, or its derivatives, by reaction with an organic compounds containing one or more reactive hydroxyl groups as the only reactive substituents.

Another feature of this invention is the provision of an improved class of detergents prepared by neutralization with alkali, or a nitrogen base, of the mixed sulfonate-sulfate acid ester prepared by reaction of carbyl sulfate, or its derivatives, with an alcohol, glycol, phenol, or the like.

Another feature of this invention is the provision of an improved process for the preparation of sulfur-containing organic compounds which comprises reacting carbyl sulfate, or a derivative of carbyl sulfate, with an alcohol, glycol, phenol, or other organic compound containing one or more reactive hydroxyl groups as the only reactive substituents.

Other objects and features of this invention will become apparent from time to time throughout the specification and claims as hereinafter related.

This invention is based upon our discovery that carbyl sulfate, or substituted forms of carbyl sulfate containing hydrocarbon substituents or other non-reactive substituents, can be reacted with an organic compound, such as an alcohol, phenol, glycol, or other organic compound in which there is present one or more reactive hydroxyl groups attached to a carbon atom as the only reactive substituents.

Carbyl sulfate is a very reactive compound which is prepared by reaction of sulfur trioxide with ethylene in a 2-to-1 mol ratio. The reaction may be carried out in solution or in the vapor phase, usually at room temperature or lower to avoid charring. Carbyl sulfate has the formula,

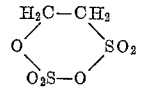

Derivatives of carbyl sulfate are known in which one or more of the hydrogen atoms on the ethylene portion of the ring are substituted with alkyl, aryl, alkaryl, aralkyl, or cycloalkyl radicals, which may be free of other substituents or which may contain non-reactive substituents. These derivatives of carbyl sulfate are generally prepared in a similar manner, i.e., by reaction of 2 mols of sulfur trioxide with 1 mol of the corresponding unsaturated compound. Thus, the reaction of propylene with sulfur trioxide produces a methyl derivative of carbyl sulfate. The reaction of α-dodecene with sulfur trioxide produces a decyl derivative of carbyl sulfate. Styrene can be reacted with sulfur trioxide to produce a phenyl derivative of carbyl sulfate, although extreme care is required in carrying out the reaction to prevent polymerization of the styrene. If sulfur trioxide is reacted with a cycloalkene, such as cyclohexene, a derivative of carbyl sulfate is obtained in which two of the hydrogen atoms are substituted by a bridging radical. These various derivatives of carbyl sulfate are also generally operative in carrying out this invention and have the general formula,

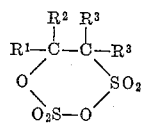

where $R^1$, $R^2$, $R^3$, and $R^4$ are the same or different, and are either hydrogen or hydrocarbon radicals, such as alkyl, aryl, alkaryl, aralkyl, or cycloalkyl.

In carrying out our invention, carbyl sulfate, or a derivative thereof, is reacted with an organic compound containing a reactive hydroxy group attached to a carbon atom as the only reactive substituent, free of other reactive substituents. The organic reactant is preferably a sample hydroxy-containing material, such as an alcohol, phenol glycol, or the like. When polyhydroxy compounds are reacted with carbyl sulfate or its derivatives, there is some tendency to form polymerized or condensed reaction products. The conditions of reaction are not critical and generally require nothing more than mixing the hydroxy-containing compound with the carbyl sulfate to produce a reaction. Throughout the specification and claims, the term "carbyl sulfate" is used in both a generic and specific sense. Thus, reference to "carbyl sulfate" means the specific compound known as carbyl sulfate, while reference to "a carbyl sulfate" means carbyl sulfate and derivatives in which one or more of the hydrogen atoms are replaced with other hydrocarbon substituents. When a carbyl sulfate is reacted with a lower alcohol, such as methanol, ethanol, propanol, isopropanol, or butanol, an exothermic reaction takes place which may require cooling to remove excess heat and reduce the intensity of reaction. It can therefore be seen that the alcohols may contain from 1 carbon atom (i.e., methanol) to 22 carbon atoms (i.e., behenyl alcohol used in Example VI). When a carbyl sulfate is mixed with a higher-molecular-weight alcohol, such as dodecanol, it may be necessary to use an inert mutual solvent to facilitate the reaction. Similarly, phenol reacts readily with carbyl sulfate, while α- and β-naphthols require the use of a solvent. Therefore, $C_6$–$C_{10}$ phenols can be reacted with a carbyl sulfate. Likewise, ethylene glycol and all normally liquid glycols, such as propylene glycol, butylene glycol, tetramethylene glycol, diethylene glycol, triethyene glycol, etc., react readily with carbyl sulfate, while the high-molecular-weight, solid glycols may require the use of a solvent to facilitate the reaction. Thus, in carrying out the reaction of a carbyl sulfate with a hydroxy-containing organic compound, reaction may be carried out with or without a solvent, depending in some measure upon the physical state of the reactants. The reaction may be carried out at room temperature or at elevated temperatures, depending upon the particular reactants used. Thus, the lower alcohols react with carbyl sulfate spontaneously at room temperature, and may even require cooling to prevent undue violence of reaction, while the higher alcohols, and the like, may require the use of slightly elevated temperatures. Where the reaction is carried out using an inert solvent, it is usually satisfactory to supply only enough heat to reflux the solution to effect reaction.

When this reaction is carried out, the carbyl sulfate ring is broken at the S-O-S link, and the alkoxy (in the case of an alkanol) part of the hydroxy-containing compound adds to one of the sulfoxy groups while the hydrogen of the hydroxy group adds to the other sulfoxy group, thereby producing a mixed acid ester represented by one of the following formulae,

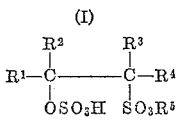

(I)

or

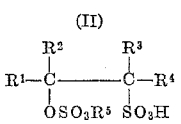

(II)

where $R^1$, $R^2$, $R^3$, and $R^4$ are hydrogen, or a hydrocarbyl radical, as previously defined for a substituted carbyl sulfate, and $R^5$ is the hydrocarbyl radical derived from the hydroxy-containing organic reactant. Since it is practically impossible to determine which structural form the reaction product has or which predominates, and since it is most probable that both products are present, the products which are formed are referred to by the general formula,

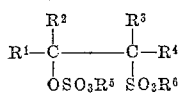

and

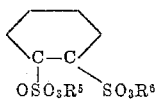

where $R^1$, $R^2$, $R^3$, and $R^4$ are hydrogen, or a hydrocarbyl radical, as previously defined for substituted forms of carbyl sulfate, and one of the radicals $R^5$ and $R^6$ is the hydroxy hydrogen and the other is the hydrocarbon radical from the hydroxy-containing organic reactant; and

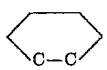

is a cycloalkene radical.

The following non-limiting examples are illustrative of the scope of this invention.

*Example I*

An 18.8 g. (0.1 mol) portion of carbyl sulfate was dissolved in 50 ml. of ethylene dichloride, and 18.6 g. (0.1 mol) of dodecyl alcohol in 25 ml. of ethylene dichloride was added. The resulting mixture became warm, indicating the occurrence of reaction, and was refluxed for 5 minutes to assure completion of reaction.

The product (in solution) which was obtained in the above reaction was reacted with 9.3 g. (0.1 mol) of aniline, in solution in 25 ml. of ethylene dichloride, to yield a clear solution. This solution was diluted with 2 volumes of ether and let stand, whereupon a first crop of product precipitated. This first crop of product was filtered from the liquid, and was found to weigh 7.0 g. Evaporation of the filtrate over a steam bath yielded a second crop of product have the same characteristics as the first crop, and weighing 30 g. The waxy, solid product which was recovered gave a positive bromine test. This product also gave a negative barium sulfate test with barium chloride, but after it had been warmed for several minutes with dilute hydrochloric acid, it gave a positive sulfate anion test with barium chloride. The two tests with barium chloride (as prepared, and after heating with hydrochloric acid) demonstrated that the oxygen atom of the sulfate group had remained attached to a carbon atom (as in the original carbyl sulfate) in the product, and that the sulfate anion was hydrolyzed from the product by contact with the warm acid. The bromine test indicated that aniline was present in the molecule. This information is strongly indicative that the product of the initial reaction had one of the two structures shown above. However, it does not show that one of the two structures actually existed alone, or predominated. The product obtained in this particular experiment was either an aniline sulfate salt of a dodecyl sulfonate ester, or an aniline sulfonate salt of a dodecyl sulfate ester, or a mixture of both.

A 0.1% wt. aqueous solution of the aniline salt recovered in the above experiment was prepared and evaluated as a surfactant and detergent. The aqueous solution formed copious quantities of foam (suds) when shaken with moderate vigor in a stoppered flask. The surface tension of this dilute solution was only 28.5 dynes/cm. Consequently, the product qualifies as an excellent surfactant. Furthermore, when a small amount of Norit carbon was added to the solution, it was found that the particles of carbon were held in suspension for a long time, thus showing that the product is an effective detergent.

*Example II*

In another experiment, 5.0 g. of carbyl sulfate was placed in a 50 ml. flask and 10 ml. of methyl alcohol were added incrementally, with cooling in ice. After the addition was completed (about 15 minutes), a small amount of the solution was withdrawn and tested for sulfate anion in distilled water with barium chloride. As was expected, the test was negative, showing that the oxygen atom of the sulfate group was still bonded to the carbon atom to which it had been bonded in the carbyl sulfate. This supports the conclusion drawn in Example I that the product had one of the two structures shown above. This conclusion was supported to an even greater extent when it was found that a positive sulfate anion test with barium chloride was obtained after the product had been warmed with dilute hydrochloric acid. A portion of the product obtained in this experiment and a portion of the product obtained in Example I were each subjected to infrared analysis which proved that the groups shown in the postulated structures were present, but it was impossible to determine whether one of the two postulated structures actually existed alone, or predominated.

When a portion of the product of this experiment is neutralized with ethanolamine, there is obtained a water-soluble neutral salt having some surfactant properties.

*Example III*

Carbyl sulfate, 10 g., is added incrementally to 20 ml. of ethylene glycol, with cooling in ice. A vigorous exothermic reaction occurs after each addition. When the reaction is complete, a solution is obtained containing a glycol sulfate-sulfonate product having the same structures as those obtained in the previous examples.

If the order of addition of reactants is reversed and ethylene glycol is added to carbyl sulfate, reaction occurs to a greater extent with both of the hydroxy groups of the glycol, and a diester product is obtained. When a polyglycol, such as diethylene glycol, triethylene glycol, dipropylene glycol, tetrapyropylene glycol, polyethylene glycol, etc., or a higher aliphatic glycol, or a dihydroxy or polyhydroxy aromatic compound, such as resorcinol, is substituted in the reaction, similar products are obtained. It will be noted that the glycols may contain from 2 carbon atoms (i.e., ethylene glycol) to 12 carbon atoms (i.e., tetrapropylene glycol). If the hydroxy compound is added to the carbyl sulfate, there is more tendency to form a condensed or polymeric product. If the carbyl sulfate is added to the hydroxy compound, there is more tendency to form a product as described in the previous examples. When these products are neutralized with a metallic base, such as potassium hydroxide, sodium hydroxide, lithium hydroxide, barium hydroxide, calcium hydroxide, etc., or with a nitrogen base, such as aniline, pyridine, ammonia, methylamine, guanidine, urea, or the like, there is obtained a water-soluble salt which has surfactant properties.

*Example IV*

Carbyl sulfate, 10.0 g., is placed in a 50 ml. flask and 20 ml. of a 50% solution of phenol in ether is added. The solution warms rapidly upon mixing, and the heat of reaction is sufficient to cause the solution to reflux. After the addition of the phenol solution is complete, a solution is obtained of a product which is a phenyl ester of a sulfonate-sulfate acid, having the same structures as the products of Examples I and II. The metal- or nitrogen-base salts of this product are prepared by neutralization of the compound with a base, and have surfactant properties.

*Example V*

Methylcarbyl sulfate (prepared by reaction of propylene with sulfur trioxide), 5.0 g., is placed in a 50 ml. flask and reacted with 10 ml. of isopropanol. The isopropanol is added slowly to the methylcarbyl sulfate, and the solution is cooled after each addition to prevent excessive violence of reaction. The product which is obtained has the same structures as the products of Examples I and II.

*Example VI*

A 5.0 g. portion of symmetrical dimethylcarbyl sulfate dissolved in 50 ml. of ethylene dichloride is mixed with a solution of an equimolar portion of behenyl alcohol dissolved in 30 ml. of ethylene dichloride. The reactants warm slightly upon mixing the solutions, and after a short period of reflux, the reaction is complete. When this product is reacted with ethanolamine, there is obtained a neutral salt which is a solid of somewhat waxy consistency. This product is water-soluble, has both surfactant and detergent properties, and may be used in the same manner as other detergents which are well known in the art.

While this invention has been described with emphasis upon several preferred embodiments, it will be obvious to those skilled in the art that the products which have been prepared represent novel compounds, all of the members of which may be prepared by analogous reaction. While the specific examples have been directed primarily to the reactions of carbyl sulfate and the lower homologues of carbyl sulfate, we wish it to be understood that we have found that this is a reaction which is characteristic of the heterocyclic ring structure of the carbyl-sulfate molecule, and which is not influenced by the presence of inert substituents in the molecule. Thus, this reaction will take place with derivatives of carbyl sulfate in which the hydrogen atoms have been replaced with one or more hydrocarbons, or substituted hydrocarbon radicals which are inert. The carbyl sulfate compounds are highly reactive and react readily with one or more hydroxyl groups in any organic compound containing one or more reactive hydroxy groups. Other substituents may be present in the hydroxy-containing reactant as long as they do not interfere with the reaction. The reaction of carbyl sulfate and its derivatives with hydroxy-containing organic compounds, such as alcohols, glycols, and phenols, is not limited to the lower-molecular-weight hydroxy-containing compounds. When the reaction is carried out with the simplest hydroxy-containing compounds, e.g., methanol, ethanol, ethylene glycol, or phenol, it is possible to carry out the reaction in the absence of solvent (although a solvent is preferred for phenol, which is normally a solid). With higher-molecular-weight alcohols, glycols, phenols, and the like, any inert solvent may be used which will dissolve both of the reactants and assure the required intimacy of contact. The reaction proceeds well at room temperature with the lower-molecular-weight, hydroxy-organic compounds, and with the higher-molecular-weight, hydroxy-organic compounds the reaction will take place with only a slight addition of heat. When the products of reaction of carbyl sulfate and its derivatives with hydroxy-containing organic compounds are obtained, they can be neutralized with a metal or nitrogen base and used as surfactants or detergents, or they may be used as intermediates in the preparation of other organic compounds, e.g., by utilizing the reactive free acid group present in these products.

While we have described this invention fully and completely with special emphasis upon several preferred embodiments, we wish it to be understood that within the scope of the appended claims, this invention may be practiced otherwise than as specifically described herein.

The embodiments of the invention in which an exclusive property or privilege is claimed are defined as follows:

1. A compound selected from the group consisting of compounds of the formula,

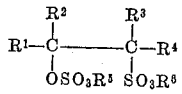

and

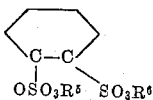

and alkali metal-, alkaline earth metal-, ammonia-, and organic nitrogen base salts thereof, where $R^1$, $R^2$, $R^3$ and $R^4$ are selected from the group consisting of hydrogen, alkyl radicals and aryl radicals, and

is a cycloalkene radical, and one of the radicals $R^5$ and $R^6$ is hydrogen and the other is a $C_1$–$C_{22}$ alkyl radical.

2. A compound according to claim 1 in which $R^1$, $R^2$, $R^3$ and $R^4$ are hydrogen and one of the radicals $R^5$ and $R^6$ is the methyl radical.

3. A compound according to claim 1 in which $R^1$, $R^2$, $R^3$ and $R^4$ are hydrogen and one of the radicals $R^5$ and $R^6$ is a $C_{12}$ alkyl radical.

4. The aniline salt of the compound of claim 3.

5. A compound according to claim 1 in which $R^1$, $R^2$, $R^3$ and $R^4$ are hydrogen and one of the radicals $R^5$ and $R^6$ is the phenyl radical.

6. A compound in accordance with claim 1 in which one of the radicals $R^5$ and $R^6$ is hydrogen and the other is a $C_6$ to $C_{10}$ aryl radical.

References Cited in the file of this patent

UNITED STATES PATENTS 2,666,788     Ebel _____ Jan. 19, 1954

OTHER REFERENCES

Gilbert et al.: Ind. and Eng. Chem., vol. 43, pages 2022–2024 (1951), TP1 A58.